US009794885B2

(12) United States Patent
Mujtaba et al.

(10) Patent No.: US 9,794,885 B2
(45) Date of Patent: Oct. 17, 2017

(54) BASEBAND MODEM IMPLEMENTING COMMUNICATION PROTOCOL STACK

(71) Applicant: Apple Inc., Cupertino, CA (US)

(72) Inventors: Syed Aon Mujtaba, Santa Clara, CA (US); Moustafa M. Elsayed, Los Gatos, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 14/326,771

(22) Filed: Jul. 9, 2014

(65) Prior Publication Data

US 2016/0014697 A1   Jan. 14, 2016

(51) Int. Cl.
| H04W 52/02 | (2009.01) |
| H04L 25/00 | (2006.01) |
| H04W 72/04 | (2009.01) |
| H04W 76/04 | (2009.01) |

(52) U.S. Cl.
CPC ......... *H04W 52/0251* (2013.01); *H04L 25/00* (2013.01); *H04W 52/0258* (2013.01); *H04W 72/042* (2013.01); *H04W 76/048* (2013.01); *Y02B 60/50* (2013.01)

(58) Field of Classification Search
CPC ......... H04W 52/0251; H04W 52/0258; H04W 72/042; H04W 76/048; H04L 25/00; Y02B 60/50
USPC ........................................................ 370/311
See application file for complete search history.

(56) References Cited

U.S. PATENT DOCUMENTS

| 5,948,105 | A | 9/1999 | Skurnik et al. |
| 7,099,949 | B1 * | 8/2006 | Vanhoof ................ H04B 1/707 375/E1.002 |
| 7,305,259 | B1 * | 12/2007 | Malone ............... H04W 52/028 455/343.1 |
| 8,493,966 | B2 | 7/2013 | Bendelac |
| 8,554,251 | B2 | 10/2013 | Bhattachargee et al. |

(Continued)

OTHER PUBLICATIONS

International Search Report & Written Opinion, Application No. PCT/US2015/037586, mailed Sep. 25, 2015, 11 pages.

(Continued)

*Primary Examiner* — Omar Ghowrwal
*Assistant Examiner* — Kokou R Detse
(74) *Attorney, Agent, or Firm* — Meyertons Hood Kivlin Kowert & Goetzel, P.C.; Jeffrey C. Hood; Matthew C. Washburn

(57) ABSTRACT

Providing a power-saving mode for control channel monitoring in discontinuous reception (DRX) scenarios. Upon waking from a sleep mode at the conclusion of a DRX off period, a baseband modem may transition to a low-power mode configured to receive and decode only a control channel, such as a physical downlink control channel (PDCCH). If the control channel indicates during a DRX on period that communication traffic will be transmitted to the baseband modem, then the baseband modem may transition to a full-power mode to receive the communication traffic. Otherwise, the baseband modem may transition back to the sleep mode. The low-power mode may be implemented by a dedicated set of hardware configured to draw less power than a full set of hardware configured to implement the high-power mode.

15 Claims, 6 Drawing Sheets

(56) References Cited

U.S. PATENT DOCUMENTS

| | | |
|---|---|---|
| 2002/0169008 A1* | 11/2002 | Hiben ............... H04W 52/0229 |
| | | 455/574 |
| 2005/0020299 A1 | 1/2005 | Malone et al. |
| 2007/0060125 A1 | 3/2007 | Rahim |
| 2007/0082716 A1* | 4/2007 | Behzad ............. H04W 52/0225 |
| | | 455/574 |
| 2010/0322126 A1 | 12/2010 | Krishnaswamy et al. |
| 2012/0243645 A1 | 9/2012 | Bougard |
| 2013/0016632 A1 | 1/2013 | Mujtaba et al. |
| 2013/0237171 A1 | 9/2013 | Lindoff et al. |
| 2013/0244686 A1* | 9/2013 | Saha ..................... G06F 1/3206 |
| | | 455/456.1 |
| 2013/0273965 A1 | 10/2013 | Jechoux et al. |
| 2013/0337795 A1* | 12/2013 | Falconetti ............... H04L 5/001 |
| | | 455/419 |
| 2014/0056194 A1 | 2/2014 | Olsson et al. |
| 2014/0157009 A1* | 6/2014 | Kherani ................ G06F 1/3278 |
| | | 713/300 |

OTHER PUBLICATIONS

Office Action for ROC (Taiwan) Patent Application No. 104122397, Aug. 2, 2016, pp. 1-29.

\* cited by examiner

BASEBAND MODEM IMPLEMENTING COMMUNICATION PROTOCOL STACK

TECHNICAL FIELD

The present application relates to wireless devices, and more particularly to a low-power cellular communication architecture.

DESCRIPTION OF THE RELATED ART

Wireless communication systems are rapidly growing in usage. Further, wireless communication technology has evolved from voice-only communications to also include the transmission of data, such as Internet and multimedia content. Wireless communication devices are most often portable, battery-powered devices. Therefore, improvements are desired in power consumption during wireless communication.

LTE® is a 3GPP® standard targeting high data rates. This is achieved through complex PHY/RF (Physical Layer/Radio Frequency) architectures to support multiple-input-multiple-output (MIMO), collision avoidance (CA), high order modulation schemes, etc. These data rates and applications require high power consumption and impact the battery life of the user equipment (UE).

However, there may be times when the UE is performing only a subset of available applications that operate at low data rates. These applications are typically limited in throughput and are periodic or non-delay-sensitive. Examples may include VoLTE, Messaging, Web-browsing, Email, Geo-fencing, etc. Also, there is an increasing interest in new form factor devices that are battery constrained, e.g., for wearable devices.

In order to save the power consumption and improve the battery life of a wireless UE, discontinuous reception (DRX) has been introduced in several wireless standards such as UMTS™, LTE® (Long-term evolution), WiMAX®, etc., which powers down most of UE modem circuitry when there are no packets to be received or transmitted ("DRX off period") and only wakes up at specified times or intervals to listen to the network ("DRX on period"). For example, during DRX on periods, the UE may monitor the physical downlink control channel (PDCCH) for a downlink (DL) assignment or an uplink (UL) grant. During DRX off periods, the network (e.g. the base station) does not schedule transmission to the UE, so the UE does not need to monitor or decode the PDCCH during those periods.

DRX can be enabled in different network connection states, including connection mode and idle mode. In connection DRX (CDRX) mode, the UE listens to the DL packets following a specified pattern determined by the base station (BS). In idle DRX (IDRX) mode, the UE listens to the page from the BS to determine if it needs to reenter the network and acquire the uplink (UL) timing. For example, in current implementations of LTE®, an IDRX cycle of 1.28 s is used to allow the UE to monitor paging. For CDRX, a cycle of 320 ms is used by default, and a 40 ms cycle is used for VoLTE.

In current implementations of LTE®, a modem may contain a single processor that performs the required functions. In such implementations, the processor may be activated during a DRX on period, and may be deactivated during a DRX off period. However, there is no partial shutdown for the subsystems which are not in use.

In other current implementations of LTE®, a modem may contain multiple cores, typically with one core used as a global scheduler for every LTE® activity. Specific tasks may be assigned to specific cores. However, there is still no partial shutdown for the subsystems which are not in use, and particularly for the core where the global scheduler resides. Additionally, substantial house-keeping software is required to manage the large pool of cores.

Both existing solutions consume large amounts of power and exhibit long delays between requests and responses. Additionally, their infrastructures (memory, buses, DMA, etc.) suffer from contentions, low efficiencies, and constant supply of power.

Further, these modem solutions are not application/use-case centric. Specifically, for a low data-rate application (e.g., VoLTE) or high data-rate application (e.g., video streaming), the existing LTE® modem operates in a similar fashion. Thus, no use-case-specific power saving can be achieved.

Hence improvements in the field are desired that can take into account low-data-rate applications.

SUMMARY

Embodiments described herein relate to a User Equipment (UE) device and associated method for further conserving power during discontinuous reception (DRX) operation. For example, the method may be implemented by a baseband modem of the UE device.

A baseband modem is disclosed, comprising a first subsystem configured to operate when the baseband modem is in a high-power mode, but not when the baseband modem is in a low-power mode, and a second subsystem configured to operate when the baseband modem is in the low-power mode, but not operate when the baseband modem is in the high-power mode. The first and second subsystems may be further configured to not operate when the baseband modem is in a sleep mode. The first subsystem may comprise a first processor, a first memory, and first baseband processing circuitry. The second subsystem may comprise a second, different processor, a second, different memory, and second, different baseband processing circuitry. The first subsystem may operate at a higher clock rate than the second subsystem.

The baseband modem may further comprise a third memory and/or third baseband processing circuitry configured to operate when the baseband modem is in the high-power mode and when the baseband modem is in the low-power mode. The third memory and/or third baseband processing circuitry may be further configured to not operate when the baseband modem is in the sleep state.

The baseband modem may be configured to utilize DRX. For example, the baseband modem may be configured to enter the sleep mode during a DRX off period, the low-power mode during a DRX on period, and the high-power mode during an active session.

More specifically, the baseband modem may be configured to transition between the modes in response to triggers. For example, the first processor may be configured to cause the baseband modem to transition from the high-power mode to the sleep mode in response to a period of communication inactivity. The baseband modem may be configured to transition from the sleep mode to the low-power mode in response to expiration of a timer. The second processor may be configured to cause the baseband processor to selectively transition to either the high-power mode or the sleep mode. For example, the second processor may be configured to monitor a control channel for an indication that a payload channel will contain communication traffic directed to the baseband modem. The control channel may be a physical downlink control channel (PDCCH), and the payload channel may be a physical downlink shared channel (PDSCH). The second processor may be configured to cause the baseband modem to transition from the low-power mode to the high-power mode in response to detecting the indication and to cause the baseband modem to transition from the low-power mode to the sleep mode in response to not detecting the indication within a predetermined period of time.

A method is disclosed for conserving power in a baseband modem. According to the disclosed method, the baseband modem may operate in a high-power mode that may support full communication traffic. The baseband modem may transition from the high-power mode to a sleep mode in response to determining a period of communication inactivity. The sleep mode may not support communication traffic. The baseband modem may transition from the sleep mode to a low-power mode in response to expiration of a timer. The low-power mode may support reception of a control channel, but may not support full communication traffic. While in the low-power mode, the baseband modem may determine whether the control channel includes an indication that a payload channel will contain communication traffic directed to the baseband modem. The low-power mode may not support reception of the payload channel. The control channel may be a physical downlink control channel (PDCCH), and the payload channel may be a physical downlink shared channel (PDSCH). If the control channel includes the indication, then the baseband modem may transition from the low-power mode to the high-power mode. If, instead, the control channel does not include the indication, then the baseband modem may transition from the low-power state to the sleep state.

Operating in the high-power mode may comprise utilizing a first set of circuitry, and operating in the low-power mode may comprise utilizing a second set of circuitry. The second set of circuitry may use less power than the first set of circuitry. For example, the first set of circuitry may operate at a higher clock rate than the second set of circuitry. The baseband modem may disable the first set of circuitry when transitioning to one of the low-power mode and the sleep mode. The baseband modem may disable the second set of circuitry when transitioning to one of the high-power mode and the sleep mode.

BRIEF DESCRIPTION OF THE DRAWINGS

A better understanding of the disclosure can be obtained when the following detailed description of the embodiments is considered in conjunction with the following drawings.

Figure 1A:
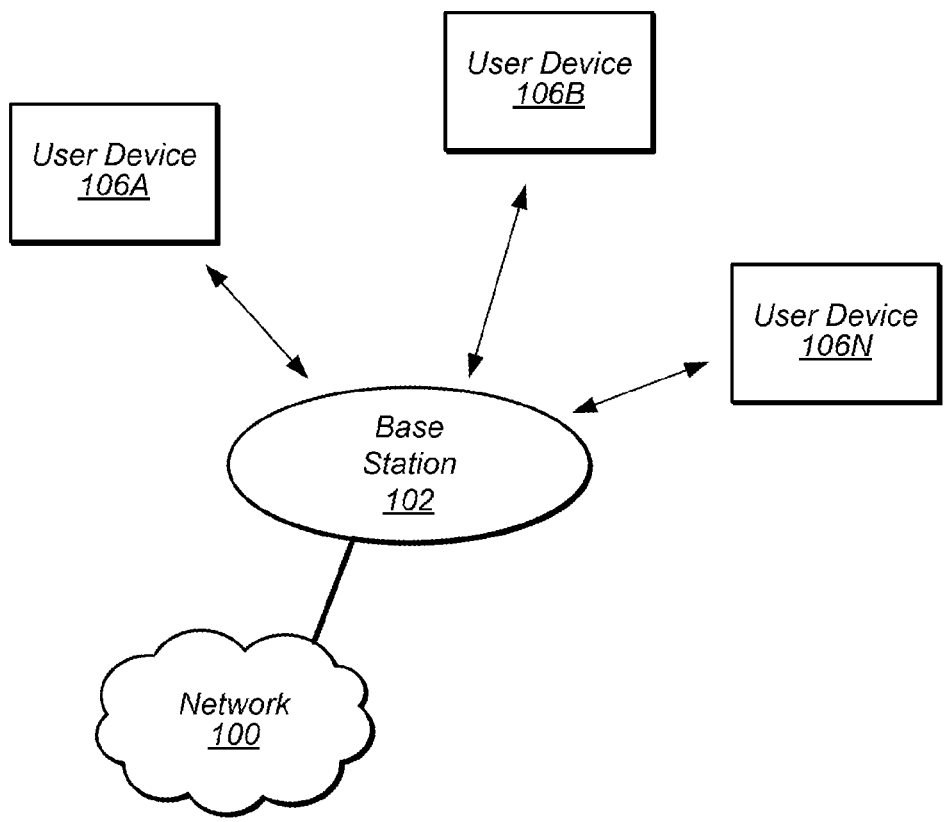
FIG. 1A illustrates an exemplary (and simplified) wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present Provisional Patent Application:
ASIC: Application Specific Integrated Circuit
BS: Base Station
CDMA: Code Division Multiple Access
CDRX: Connected Discontinuous Reception
DL: Downlink
DRX: Discontinuous Reception
FPGA: Field Programmable Gate Array
GSM: Global System for Mobile Communications
IDRX: Idle Discontinuous Reception
LTE: Long-Term Evolution
MMU: Memory Management Unit
PDCCH: Physical Downlink Control Channel
PDSCH: Physical Downlink Shared Channel
PO: Paging Occasion
RAT: Radio Access Technology
RFIC: Radio Frequency Integrated Circuit
ROM: Read-Only Memory
RRC: Radio Resource Control
Rx: Reception
SOC: System on a Chip
Tx: Transmission
UE: User Equipment
UL: Uplink
UMTS: Universal Mobile Telecommunication System
WLL: Wireless Local Loop
WAN: Wireless Area Network

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
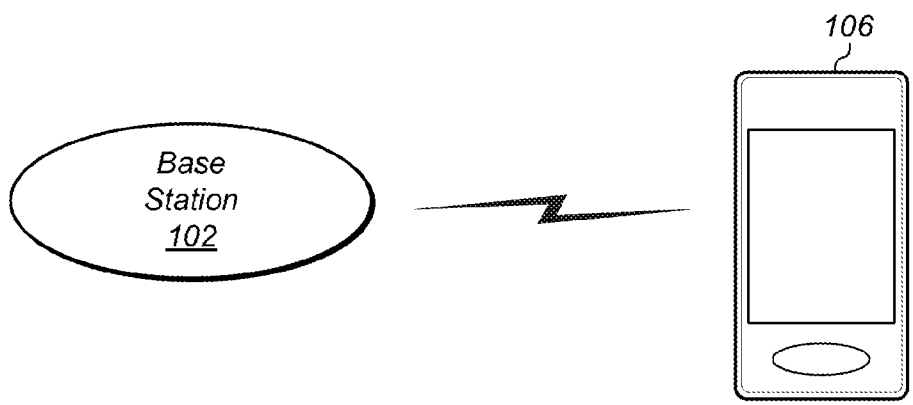
FIG. 1B illustrates a base station in communication with a user equipment (UE) device.

FIGS. 1A and 1B—Communication System

FIG. 1A illustrates an exemplary (and simplified) wireless communication system. It is noted that the system of FIG. 21 is merely one example of a possible system, and other embodiments may be implemented in any of various systems, as desired.

As shown, the exemplary wireless communication system includes a base station 102 which communicates over a transmission medium with one or more User Equipment (UE) (or "UE devices") 106A through 106N.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs 106 and/or between the UEs 106 and the network 100. The communication area (or coverage area) of the base station may be referred to as a "cell." The base station 102 and the UEs 106 may be configured to communicate over the transmission medium using any of various wireless communication technologies such as LTE® (Long Term Evolution), GSM™ (Global System for Mobile communications), CDMA (Code Division Multiple Access), WLL (Wireless Local Loop), WAN (wireless area network), Wi-Fi®, WiMAX®, etc.

FIG. 1B illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

In some embodiments, the UE 106 may be configured to utilize discontinuous reception (DRX) when communicating with the base station 102. The base station 102 may not schedule transmission to the UE 106 during DRX off periods.

Figure 2:
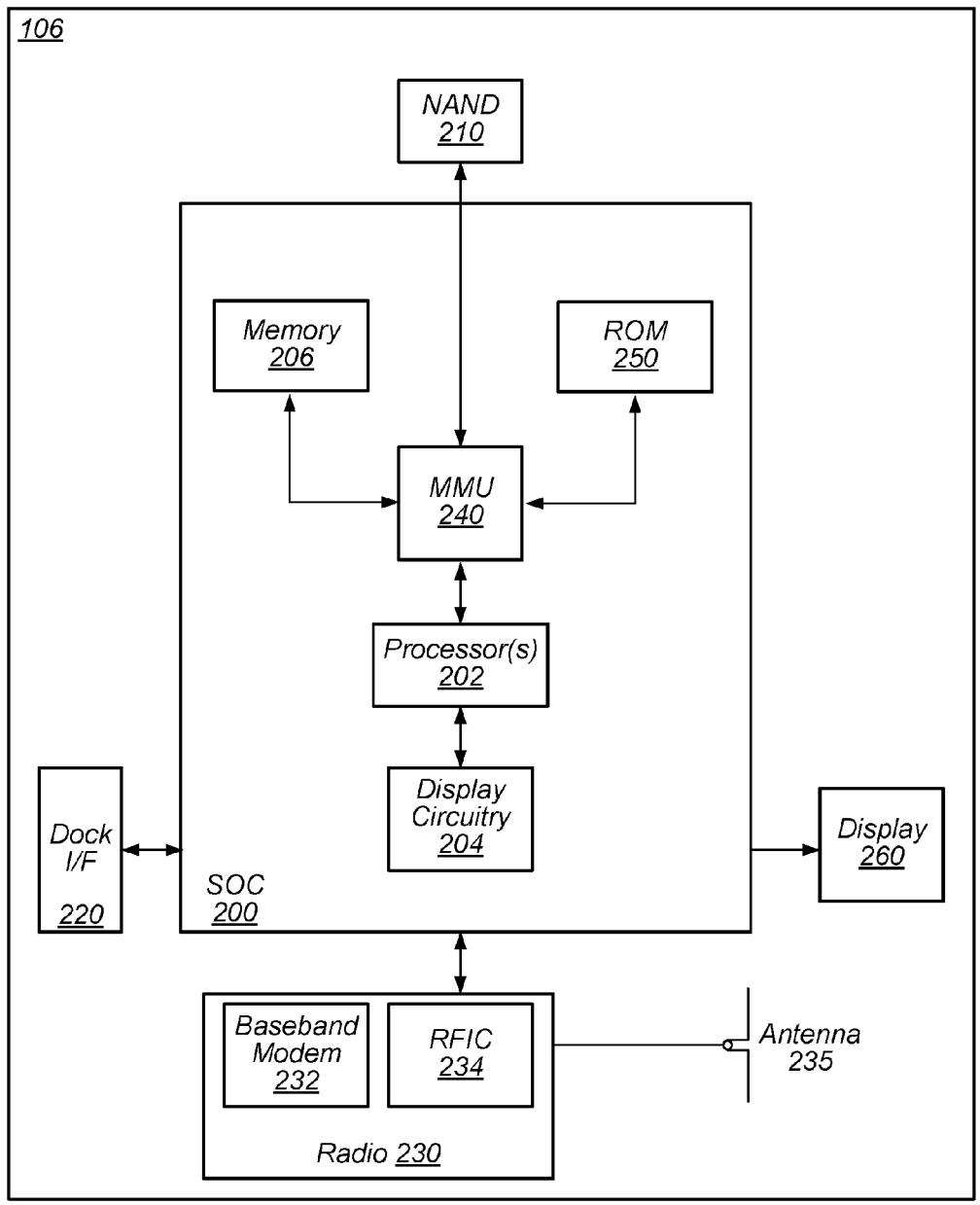
FIG. 2 illustrates an exemplary block diagram of a UE, according to one embodiment.

FIG. 2—Exemplary Block Diagram of a UE

FIG. 2 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 260. The MMU 240 may be configured to perform memory protection and page table translation or set up. In some embodiments, the MMU 240 may be included as a portion of the processor(s) 202.

As also shown, the SOC 200 may be coupled to various other circuits of the UE 106. For example, the UE 106 may include various types of memory (e.g., including NAND flash 210), a connector interface 220 (e.g., for coupling to the computer system), the display 260, and wireless communication circuitry such as radio 230 (e.g., for LTE®, GSM™, Bluetooth®, Wi-Fi®, etc.) which may use antenna 235 to perform the wireless communication. As described herein, the UE 106 may include hardware and software components for implementing multi-state DRX to achieve increased power savings.

The radio 230 may comprise one or more radio circuits configured to communicate via one or more radio access technologies (RATs), such as LTE®, GSM™, CDMA, WLL, WAN, Wi-Fi®, WiMAX®, Bluetooth®, etc. For a given RAT, the radio 230 may comprise a baseband modem 232 and a radio frequency integrated circuit (RFIC) 234. For example, the RFIC 234 may be connected to the antenna 235 and to the baseband modem 232, and may be configured to convert between RF signals transmitted or received by the antenna 235 and baseband signals processed by the baseband modem 232. In some embodiments, the baseband modem 232 may alternatively be included in the SOC 200 or elsewhere in the UE 106.

The baseband modem 232 or other portions of the UE 106 may be configured to implement part or all of the methods described herein, e.g., by executing program instructions stored on a memory medium (e.g., a non-transitory computer-readable memory medium). Alternatively, the baseband modem 232 may be configured as a programmable hardware element, such as an FPGA (Field Programmable Gate Array), or as an ASIC (Application Specific Integrated Circuit), or a combination thereof.

Figure 3:
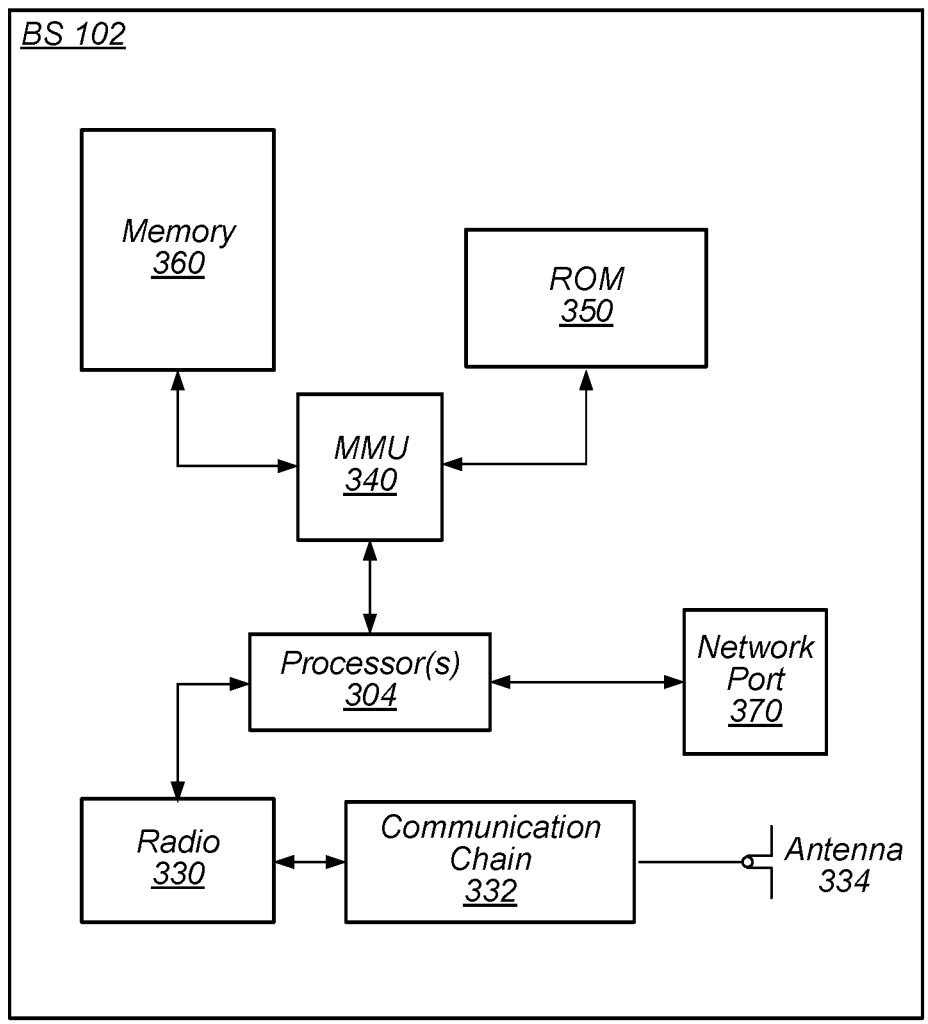
FIG. 3 illustrates an exemplary block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices 106 serviced by the cellular service provider).

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various RATs including, but not limited to, LTE®, GSM™, TDS, WCDMA, CDMA2000®, etc.

The processor(s) 304 of the base station 102 may be configured to implement part or all of the methods described herein, e.g., by executing program instructions stored on a memory medium (e.g., a non-transitory computer-readable memory medium).

Alternatively, the processor 304 may be configured as a programmable hardware element, such as an FPGA (Field Programmable Gate Array), or as an ASIC (Application Specific Integrated Circuit), or a combination thereof.

Figure 4:
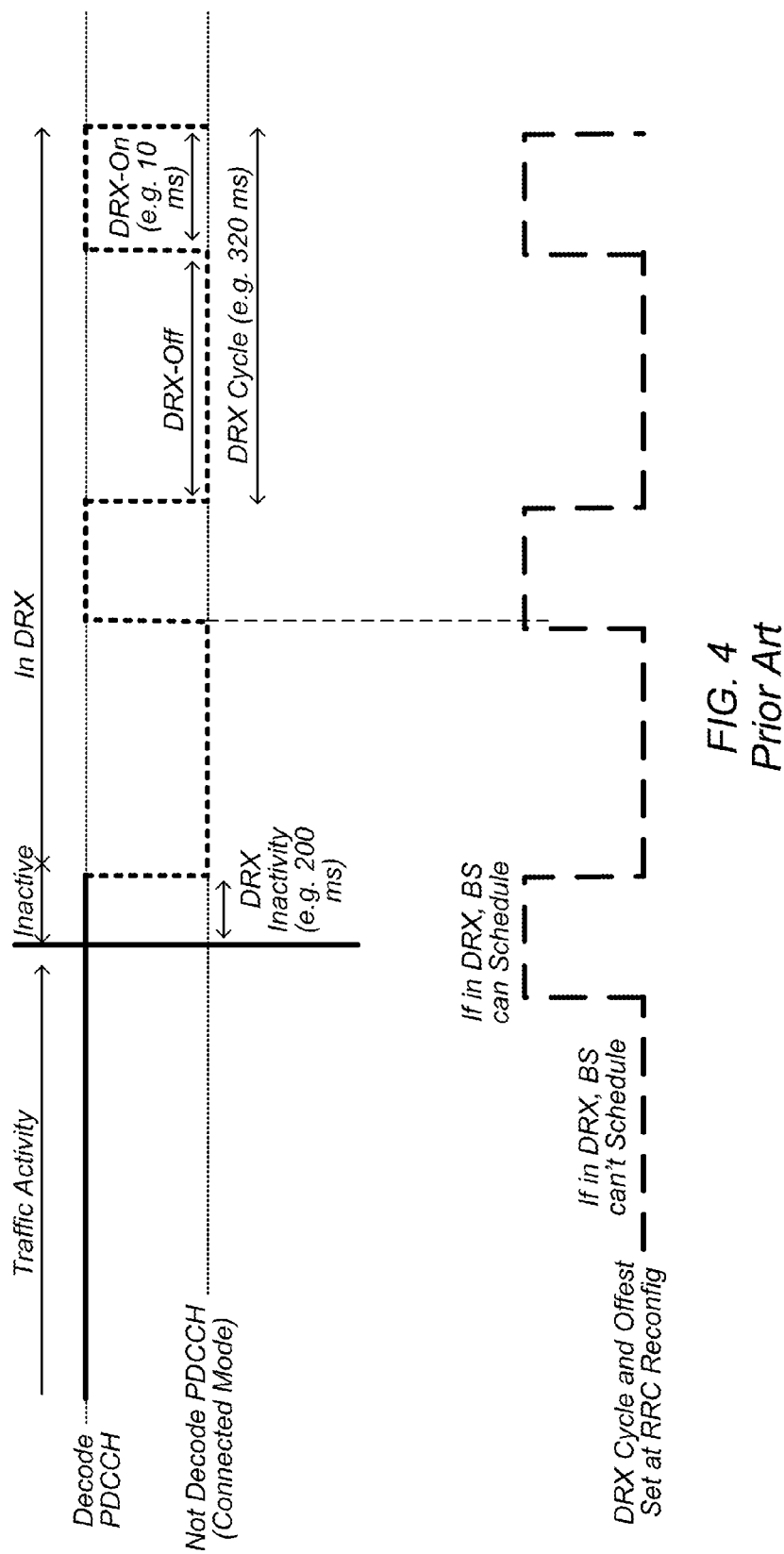
FIG. 4 is a timeline illustrating an example of Connected Discontinuous Reception (CDRX) operation.

FIG. 4—DRX Operation

The term "DRX" refers to "discontinuous reception" and refers to a mode which powers down at least a portion of UE circuitry when there are no packets to be received or transmitted and wakes up at specified times or intervals to listen to the network. DRX is present in several wireless standards such as UMTS™, LTE®, WiMAX®, etc. The term "DRX" is explicitly intended to at least include the full extent of its ordinary meaning, as well as similar types of modes in future standards.

In LTE®, the DRX mode can be enabled in both RRC (radio resource control) CONNECTION and RRC IDLE states. In the RRC_CONNECTION state, the DRX mode (CDRX mode) may be enabled during the idle period of the DL packet arrival. In the RRC_IDLE state (IDRX mode), the UE may be paged for DL traffic or may initiate UL traffic by requesting RRC connection with the serving base station (BS).

The parameters for DRX cycles may be configured by the BS through different timers:

1) The DRX inactivity timer indicates the time in number of consecutive subframes to wait before enabling DRX.

2) Short DRX cycles and long DRX cycles are defined to allow the BS to adjust the DRX cycles based on the applications. In generation, a DRX short cycle timer may be defined to determine when to transition to the long DRX cycle.

3) When there is no reception of packets for an extended period of time after the successful reception of a packet, the BS may initiate RRC connection release and the UE may enter the RRC IDLE state, during which the idle DRX can be enabled.

4) The ON duration timer may be used to determine the number of frames over which the UE will read the DL control channel every DRX cycle before entering power saving mode. The allowed values are 1,2,3,4,5,6,8,10,20,30, 40,50,60,80,100, and 200.

5) During idle DRX mode, the UE may only monitor one paging occasion (PO) per DRX cycle, which is one subframe.

FIG. 4 is a timeline illustrating an example of CDRX operation. The upper waveform shows the state of a UE. Initially, the UE may be in an Awake state in which it is capable of decoding the Physical Downlink Control Channel (PDCCH). For example, the UE may remain in this state in response to continued traffic activity on the channel. At some point in time, traffic activity stops, and the channel becomes inactive. When the UE detects that the channel remains inactive for a predetermined period of time (e.g., 200 ms), it enters a CDRX mode, and begins a DRX off period. During the DRX off period, the UE remains in a Sleep state, in which it is not capable of decoding the PDCCH. After a predetermined period of time (e.g., 310 ms), a DRX on period begins, and the UE returns to the Awake state. During the DRX on period, the UE listens for the PDCCH. After a predetermined period of time (e.g., 10 ms), another DRX off period begins. This cycle may continue until the UE decodes a PDCCH indicating that the BS has data to transmit to the UE, requiring the UE to terminate the DRX mode. The lower waveform shows the periods of time during which the BS may transmit a PDCCH to the UE. These periods must be synchronized with the DRX on periods of the UE, and may be defined in a Radio Resource Control (RRC) Reconfiguration message.

Figure 5:
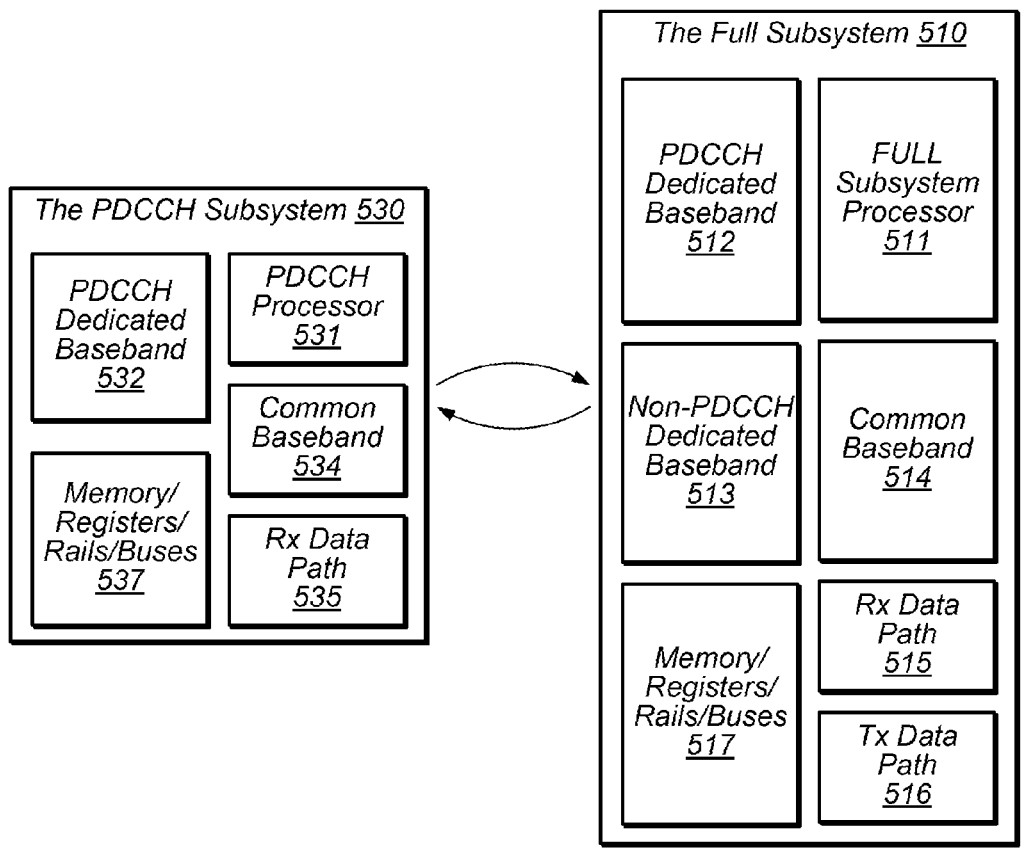
FIG. 5 illustrates two exemplary subsystems of a baseband modem, according to one embodiment.

FIG. 5—Baseband Modem Subsystems

FIG. 5 illustrates two exemplary subsystems of a baseband modem, such as the baseband modem 232 of FIG. 2, according to one embodiment. The exemplary subsystems of FIG. 5 may be configured to implement any of the methods or procedures discussed herein.

The full subsystem 510 of FIG. 5 illustrates a hardware subsystem of the baseband modem 232 configured to implement a Full state 610, as discussed below, according to one embodiment. For example, the full subsystem 510 may implement a full version of a wireless communication protocol stack, such as an LTE® protocol stack. Various embodiments of the full subsystem 510 may comprise additional components other than those shown in FIG. 5, and/or may omit one or more of the components shown.

As illustrated, the full subsystem 510 may comprise a full subsystem processor 511, which may control the functionality of the full subsystem 510. The full subsystem 510 may further comprise various baseband signal processing circuitry. For example, a PDCCH dedicated baseband module 512 may comprise circuitry dedicated to baseband processing of the PDCCH. A non-PDCCH dedicated baseband module 513 may similarly comprise circuitry dedicated to baseband processing of signals other than the PDCCH. A common baseband processing module 514 may comprise circuitry used in baseband processing of both PDCCH and non-PDCCH signals.

The full subsystem 510 may further comprise an Rx data path 515, which may comprise circuitry for processing data received from the RFIC. A Tx data path 516 may comprise circuitry for processing data to be transmitted via the RFIC. The full subsystem 510 may also comprise various supporting hardware 517, which may include memory, registers, rails, buses, etc., to facilitate the functioning and interconnection of the other hardware components. For example, the supporting hardware 517 may include memory for storing instructions for implementing the protocol stack. The supporting hardware 517 may further comprise memory for storing state information of the full subsystem 510.

The PDCCH subsystem 530 of FIG. 5 illustrates a hardware subsystem of the baseband modem 232 configured to implement a PDCCH state 506, as discussed below, according to one embodiment. For example, the PDCCH subsystem 530 may implement a partial version of a wireless communication protocol stack, such as an LTE® protocol stack. For example, the partial version of the protocol stack may comprise only the portions of the protocol stack required for reception and decoding of the PDCCH. In other embodiments, the partial version of the protocol stack may further comprise portions of the protocol stack required for other functions. Various embodiments of the PDCCH subsystem 530 may comprise additional components other than those shown in FIG. 5, and/or may omit one or more of the components shown.

As illustrated, the PDCCH subsystem 530 may comprise a PDCCH processor 531, which may control the functionality of the PDCCH subsystem 530. Because the PDCCH subsystem 530 may implement only a partial version of the protocol stack, the PDCCH processor 531 may be physically smaller and may consume less power than the full subsystem processor 511.

The PDCCH subsystem 530 may further comprise various baseband signal processing circuitry. For example, a PDCCH dedicated baseband module 532 may comprise circuitry dedicated to baseband processing of the PDCCH. In a preferred embodiment, the PDCCH dedicated baseband module 532 may be separate from the PDCCH dedicated baseband module 512 of the full subsystem 510, and may comprise identical circuitry or a smaller set of circuitry than the PDCCH dedicated baseband module 512. However, in other embodiments, the PDCCH dedicated baseband module 532 may be the same module as the PDCCH dedicated baseband module 512, or may comprise a subset of the circuitry comprised in the PDCCH dedicated baseband module 512. Similarly, the PDCCH subsystem 530 may comprise a common baseband processing module 534, which may perform functions for processing the PDCCH similar to those performed by the common baseband processing module 514. The common baseband processing module 534 may be separate from, or may comprise a subset of the common baseband processing module 514. Because the PDCCH subsystem 530 may be configured to process only the PDCCH, it may not include non-PDCCH dedicated baseband processing hardware such as that found in the full subsystem 510.

The PDCCH subsystem 530 may further comprise an Rx data path 535 comprising circuitry for processing data received from the RFIC. The RX data path 535 may be separate from, or may comprise a subset of the Rx data path 515. Because the PDCCH subsystem 530 may not be configured to transmit, it may not include a Tx data path such as that found in the full subsystem 510.

The PDCCH subsystem 530 may also comprise various supporting hardware 537, which may include memory, registers, rails, buses, etc. to facilitate the functioning and interconnection of the other hardware components. For example, the supporting hardware 537 may include memory for storing instructions for implementing the partial version of the protocol stack. The supporting hardware 537 may further comprise memory for storing state information of the PDCCH subsystem 530. The supporting hardware 537 may be separate from, or may comprise a subset of the supporting hardware 517 of the full sub system 510.

In general, because the PDCCH subsystem 530 may be configured to implement only a partial version of the protocol stack, the PDCCH subsystem 530 may be considerable smaller and less complex than the full subsystem 510. For example, each of the modules of the PDCCH subsystem illustrated in FIG. 5 may be specialized to perform only PDCCH reception and decoding, and hardware not required for these functions may be excluded. Additionally, The PDCCH subsystem 530 may require substantially less memory than the full subsystem 510. For example, the memory included in the supporting hardware 537 for storing instructions for implementing the partial version of the protocol stack may be substantially smaller than the memory included in the supporting hardware 517 for storing instructions for implementing the full protocol stack. Similarly, the memory included in the supporting hardware 537 for storing state information of the PDCCH subsystem 530 may be substantially smaller than the memory included in the supporting hardware 517 for storing state information of the full subsystem 510.

Because the PDCCH subsystem 530 may be smaller and less complex than the full subsystem 510, the PDCCH subsystem 530 may also operate faster and draw less power. For example, the buses and other interconnects of the PDCCH subsystem 530 may be shorter than those of the full subsystem 510, and may thus draw less power. As another example, the data processing pipeline may be simplified, which may reduce latency. Additionally, because the state information of the PDCCH subsystem 530 may be smaller than that of the full subsystem 510, storing and restoring the state information may be faster and may consume less power than similar operations performed by the full subsystem 510.

Additionally, because relatively little data may be contained in the PDCCH, the PDCCH subsystem 530 may be clocked at a rate lower than a clock rate of the full subsystem 510. This may further reduce power consumption in the PDCCH subsystem 530, relative to the full subsystem 510.

Figure 6:
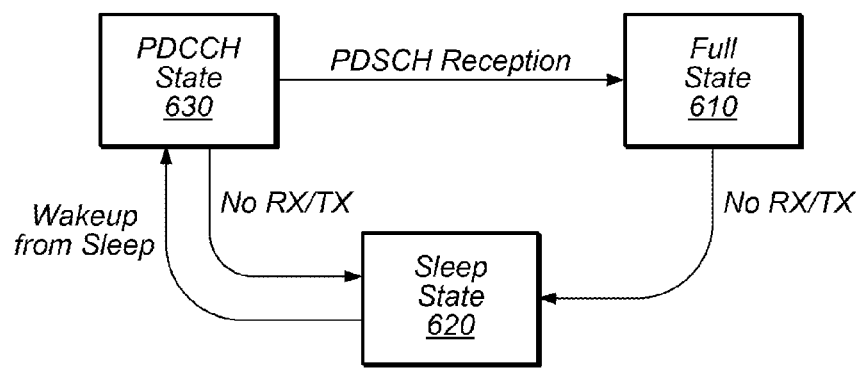
FIG. 6 illustrates a state diagram for a UE to further conserve power when utilizing DRX.

FIG. 6—State Diagram of the Baseband Modem

FIG. 6 illustrates a state diagram for a UE, such as the UE 106, to further conserve power when utilizing DRX. For example, the state diagram may be implemented by the baseband modem 232 of FIG. 2.

In a Full state 610, the baseband modem may have full functionality. For example, in the Full state 610, the baseband modem may be configured to support full communication traffic, e.g., by transmitting and receiving normal communication traffic. The Full state 610 may be considered a high-power mode because it requires sufficient power to support full communication functionality. Specifically, the Full state 610 may be implemented by the full subsystem 510. Thus, while the baseband modem is in the Full state 610, the full subsystem 510 may be enabled, and the PDCCH subsystem 530 may be disabled. For example, in some scenarios, a power supply and/or a clock signal to the PDCCH subsystem 530 may be disabled, such that the PDCCH subsystem 530 is not operable and/or consumes no power. However, in embodiments in which the PDCCH subsystem 530 shares components with the full subsystem 510, the shared components may remain enabled in the Full state 610.

While in the Full state 610, if the baseband modem 232 is idle for a predetermined period of time (e.g., the time indicated by the DRX inactivity timer), then the baseband modem may transition to a Sleep state 620. For example, the baseband modem may monitor the PDCCH while in the Full state 610, and transition to the Sleep state 620 if the PDCCH does not include a downlink (DL) assignment or uplink (UL) grant for the baseband modem for the predetermined period of time. The transitioning from the Full state 610 to the Sleep state 620 may comprise saving state information of the full subsystem 510 and/or other components of the baseband modem. In some embodiments, the transitioning from the Full state 610 to the Sleep state 620 may comprise entering a DRX mode, and specifically a DRX off period, according to procedures known in the art.

In the Sleep state 620, the baseband modem 232 may be disabled. Specifically, the full subsystem 510 and the PDCCH subsystem 530 may be disabled. For example, one or more power supplies and/or clock signals to the full subsystem 510, to the PDCCH subsystem 530, and/or to other components of the baseband modem may be disabled while the baseband modem is in the Sleep state 620. For example, a local clock generation circuit may be disabled. Thus, while in the Sleep state 620, the baseband modem may use little or no power. Additionally, while in the Sleep state 620, the baseband modem may not support transmitting or receiving communication traffic. Specifically, while in the Sleep state 620, the baseband modem may not monitor the PDCCH.

After a predetermined period of time (e.g., a DRX off period, such as according to the schedule defined in the RRC Reconfiguration message, or according to a paging occasion for the UE), the baseband modem 232 may transition to a PDCCH state 630. In the PDCCH state 630, the baseband modem may have partial functionality. For example, in the PDCCH state 630, the baseband modem may be configured to receive and decode a PDCCH. However, the baseband modem in the PDCCH state 630 may not be configured to transmit communications, or to receive communications other than the PDCCH. For example, while in the PDCCH state 630, the baseband modem may not be configured to receive a Physical Downlink Shared Channel (PDSCH).

The PDCCH state 630 may be considered a low-power mode because it requires only sufficient power to support a reduced set of functions, such as reception and decoding of the PDCCH. Specifically, the PDCCH state 630 may be implemented by the PDCCH subsystem 530. The transitioning from the Sleep state 620 to the PDCCH state 630 may thus comprise enabling the PDCCH subsystem 530, which may include restoring state information of the PDCCH subsystem 530. Thus, while the baseband modem is in the PDCCH state 630, the PDCCH subsystem 530 may be enabled, and the full subsystem 610 may be disabled. For example, in some scenarios, a power supply and/or a clock signal to the full subsystem 510 may be disabled, such that the full subsystem 510 is not operable and/or consumes no power. However, in embodiments in which the PDCCH subsystem 530 shares components with the full subsystem 510, the shared components may remain enabled in the PDCCH state 630.

It should be appreciated that the PDCCH state 630 is intended merely to be a low-power state, and may not be limited exclusively to receiving the PDCCH in some embodiments. Specifically, in some embodiments the baseband modem may be further configured to perform other limited functions while in the PDCCH state 630, such as receiving and decoding portions of a signal other than the PDCCH and/or performing limited transmission functions.

While in the PDCCH state 630, the baseband modem 232 may monitor the PDCCH for an indication of traffic relevant to the baseband modem. For example, the baseband modem may determine whether the PDCCH includes a DL assignment, UL grant, and/or paging information for the baseband modem. Specifically, the baseband modem may determine whether the PDCCH indicates that data for the baseband modem will be included in the PDSCH.

If the PDCCH does not include, within a predetermined period of time (e.g., the DRX on period), an indication of traffic relevant to the baseband modem, then the baseband modem may transition back to the Sleep state 620. The transitioning from the PDCCH state 630 to the Sleep state 620 may comprise saving state information of the PDCCH subsystem 530 and/or other components of the baseband modem.

If, instead, the PDCCH does include, within the predetermined period of time, an indication of traffic relevant to the baseband modem, then the baseband modem may transition to the Full state 610. The transitioning from the PDCCH state may comprise saving state information of the PDCCH subsystem 530, disabling the PDCCH subsystem 530, enabling the full system 510, and restoring state information of the full subsystem 510. In the Full state 610, the baseband modem may be configured to send and/or receive communications as indicated by the PDCCH. For example, in the Full state 610, the baseband modem may be configured to receive and decode the PDSCH.

Figure 7:
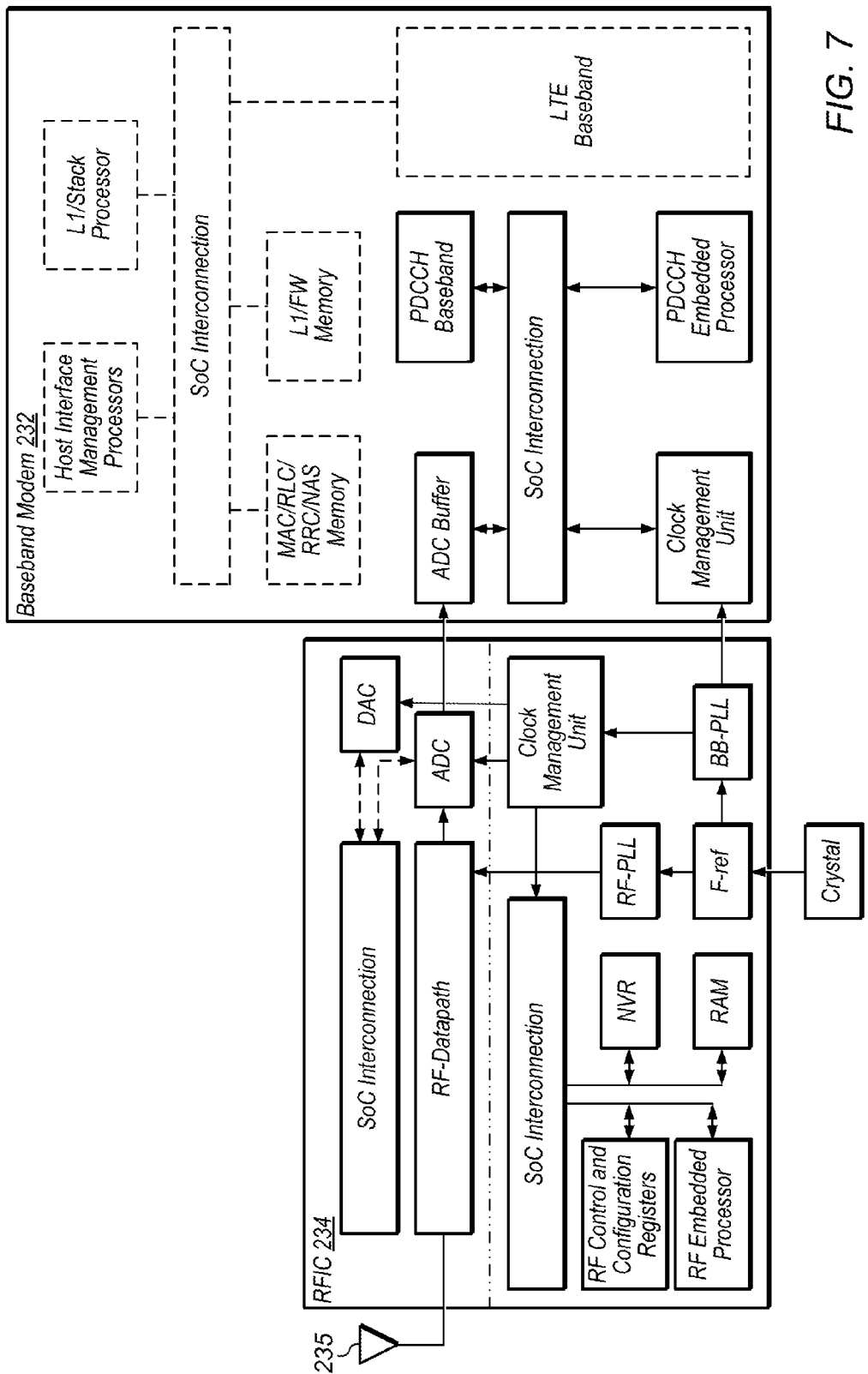
FIG. 7 illustrates a partial block diagram of a radio system, according to one embodiment.

FIG. 7—Radio System

FIG. 7 illustrates a partial block diagram of a radio system, such as the radio 230 of FIG. 2, according to one embodiment. As shown, the radio 230 may comprise the baseband modem 232 and the RFIC 234. Either or both of the baseband modem 232 and the RFIC 234 may comprise components other than those shown in FIG. 7, or may omit components shown in FIG. 7. FIG. 7 is intended merely as a partial block diagram illustrating the subsystems of the baseband modem in context, and is not intended to show all components. For example, the baseband modem 232 may comprise components for implementing each of the modules shown in FIG. 5.

As shown, the RFIC 234 may be connected to the antenna 235 and to the baseband modem 232, and may be configured to convert between RF signals transmitted or received by the antenna 235 and baseband signals processed by the baseband modem 232.

The baseband modem 232 may comprise various components configured to implement the state diagram of FIG. 6. Such components may be conceptually and/or spatially grouped into subsystems, such as the full subsystem 510 and the PDCCH subsystem 530. The baseband modem 232 is illustrated in the PDCCH state 630, where exemplary enabled components are illustrated with solid lines and exemplary disabled components are illustrated with dotted lines. For example, the enabled PDCCH Baseband component may correspond to the PDCCH dedicated baseband module 532. Similarly, the enabled PDCCH Embedded Processor component may correspond to the PDCCH processor 531. The disabled L1/Stack Processor component may correspond to the full subsystem processor 511, and the disabled LTE® Baseband component may correspond to the non-PDCCH dedicated baseband module 513. Other components, such as the ADC Buffer and the Clock Management Unit may be utilized by both the full subsystem 510 and the PDCCH subsystem 530, and may therefore remain enabled in both the Full state 610 and the PDCCH state 630. Alternatively, each subsystem may have a separate embodiment of one or more of those components.

Further Embodiments

Note that in the present description, various embodiments are described in the context of LTE®. However, it is noted that the methods described herein can be generalized for other wireless technologies and are not limited to the specific descriptions provided above. For example, any discussion of the PDCCH may be generalized to control channels according to other wireless technologies, and any discussion of the PDSCH may be generalized to payload channels according to other wireless technologies.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Yet other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband modem comprising:
a first subsystem configured to operate when the baseband modem is in a high-power mode and to not operate when the baseband modem is in a low-power mode, the first subsystem comprising:
a first processor;
a first memory, configured to store instructions for implementing a communication protocol stack; and
first baseband processing circuitry;
a second subsystem configured to operate when the baseband modem is in the low-power mode and to not operate when the baseband modem is in the high-power mode, the second subsystem comprising:
a second processor, different from the first processor;
a second memory, different from the first memory, configured to store instructions for implementing a partial version of the communication protocol stack; and
second baseband processing circuitry, different from the first baseband processing circuitry; and
third baseband processing circuitry configured to operate when the baseband modem is in the high-power mode and when the baseband modem is in the low-power mode;
wherein the baseband modem is configured to transition from a sleep mode to the low-power mode in response to expiration of a timer.

2. The baseband modem of claim 1, further comprising a third memory configured to operate when the baseband modem is in the high-power mode and when the baseband modem is in the low-power mode.

3. The baseband modem of claim 1, wherein the first subsystem and the second subsystem are configured to not operate when the baseband modem is in the sleep mode.

4. The baseband modem of claim 3, wherein the baseband modem is configured to utilize discontinuous reception (DRX), wherein the baseband modem is configured to enter the sleep mode during a DRX off period, wherein the baseband modem is configured to enter the low-power mode during a DRX on period, and wherein the baseband modem is configured to enter the high-power mode during an active session.

5. The baseband modem of claim 3,
wherein the first processor is configured to cause the baseband modem to transition from the high-power mode to the sleep mode in response to a period of communication inactivity; and wherein the second processor is configured to:
monitor a control channel for an indication that a payload channel will contain communication traffic directed to the baseband modem;
cause the baseband modem to transition from the low-power mode to the high-power mode in response to detecting the indication; and
cause the baseband modem to transition from the low-power mode to the sleep mode in response to not detecting the indication within a predetermined period of time.

6. The baseband modem of claim 5, wherein the baseband modem communicates according to a cellular radio access technology that includes the control channel and the payload channel, wherein the control channel is a physical downlink control channel (PDCCH) and the payload channel is a physical downlink shared channel (PDSCH).

7. The baseband modem of claim 1, wherein the first subsystem operates at a first clock rate and the second subsystem operates at a second clock rate, wherein the first clock rate is higher than the second clock rate.

8. A method for conserving power in a baseband modem, the baseband modem configured to use a cellular radio access technology having a control channel and a payload channel, the method comprising:
at the baseband modem:
operating in a high-power mode using a first set of circuitry, wherein the high-power mode supports full communication traffic by implementing a protocol stack of the cellular radio access technology, the protocol stack being stored in a first memory of the first set of circuitry;
transitioning from operating in the high-power mode to operating in a sleep mode in response to determining a period of communication inactivity, wherein the sleep mode does not support communication traffic;
transitioning from operating in the sleep mode to operating in a low-power mode using a second set of circuitry, in response to expiration of a timer, wherein the second set of circuitry uses less power than the first set of circuitry, wherein the low-power mode supports reception of the control channel by implementing a partial version of the protocol stack stored in a second memory of the second set of circuitry, and wherein the partial version of the protocol stack does not support reception of the payload channel;
disabling the first set of circuitry when transitioning to one of the low-power mode and the sleep mode; and
disabling the second set of circuitry when transitioning to one of the high-power mode and the sleep mode, wherein a third set of circuitry remains enabled in both the low-power mode and the high-power mode.

9. The method of claim 8, further comprising:
determining, while in the low-power mode, whether the control channel includes an indication that the payload channel will contain communication traffic directed to the baseband modem;
if the control channel includes the indication:
transitioning from the low-power mode to the high-power mode; and
if the control channel does not include the indication:
transitioning from the low-power mode to the sleep mode.

10. The method of claim 9, wherein the control channel is a physical downlink control channel (PDCCH) and the payload channel is a physical downlink shared channel (PDSCH).

11. The method of claim 9, wherein the first set of circuitry operates at a higher clock rate than the second set of circuitry.

12. A non-transitory computer-readable memory medium storing instructions executable by a baseband modem to cause the baseband modem to:
operate in a high-power mode utilizing a first set of circuitry, wherein the high-power mode supports full communication traffic by implementing a communication protocol stack stored in a first memory of the first set of circuitry;
transition from operating in the high-power mode to operating in a sleep mode in response to determining a period of communication inactivity, wherein the sleep mode does not support communication traffic; and
transition from operating in the sleep mode to operating in a low-power mode utilizing a second set of circuitry, in response to expiration of a timer, wherein the low-power mode supports reception of a control channel by implementing a partial version of the communication protocol stack stored in a second memory of the second set of circuitry, and wherein the partial version of the protocol stack does not support full communication traffic;
wherein the first set of circuitry is disabled while the baseband modem is in the low-power mode and while the baseband modem is in the sleep mode; and
wherein the second set of circuitry is disabled while the baseband modem is in the high-power mode and while the baseband modem is in the sleep mode, wherein a third set of circuitry remains enabled in both the low-power mode and the high-power mode.

13. The non-transitory computer-readable memory medium of claim 12, wherein the instructions are further executable to cause the baseband modem to:
determine, while in the low-power mode, whether the control channel includes an indication that a payload channel will contain communication traffic directed to the baseband modem, wherein the low-power mode does not support reception of the payload channel;
if the control channel includes the indication:
transition from the low-power mode to the high-power mode; and
if the control channel does not include the indication:
transition from the low-power mode to the sleep mode.

14. The non-transitory computer-readable memory medium of claim 13, wherein the baseband modem communicates according to a cellular radio access technology that includes the control channel and the payload channel, wherein the control channel is a physical downlink control channel (PDCCH) and the payload channel is a physical downlink shared channel (PDSCH).

15. The non-transitory computer-readable memory medium of claim 12, wherein the first set of circuitry operates at a higher clock rate than the second set of circuitry.

* * * * *